(12) United States Patent
Hudman (10) Patent No.: US 11,467,444 B2
(45) Date of Patent: Oct. 11, 2022

(54) MICRO-LENS ARRAY POLARIZATION RECYCLING OPTIC FOR ILLUMINATION OPTICS

(71) Applicant: Valve Corporation, Bellevue, WA (US)

(72) Inventor: Joshua Mark Hudman, Issaquah, WA (US)

(73) Assignee: Valve Corporation, Bellevue, WA (US)

( * ) Notice: Subject to any disclaimer, the term of this patent is extended or adjusted under 35 U.S.C. 154(b) by 58 days.

(21) Appl. No.: 17/169,000

(22) Filed: Feb. 5, 2021

(65) Prior Publication Data

US 2021/0247646 A1     Aug. 12, 2021

Related U.S. Application Data

(60) Provisional application No. 62/971,179, filed on Feb. 6, 2020.

(51) Int. Cl.
*G02F 1/1335* (2006.01)
*G02F 1/13363* (2006.01)

(52) U.S. Cl.
CPC .. *G02F 1/133538* (2021.01); *G02F 1/133504* (2013.01); *G02F 1/133526* (2013.01);
(Continued)

(58) Field of Classification Search
CPC ......... G02F 1/133538; G02F 1/133633; G02F 1/133638; G02F 1/133504; G02F 1/133526; G02F 1/133636
See application file for complete search history.

(56) References Cited

U.S. PATENT DOCUMENTS 6,982,773 B2   1/2006   Kurtz et al.
7,160,017 B2   1/2007   Lee et al.
(Continued)

FOREIGN PATENT DOCUMENTS

WO   2019/071267 A1   4/2019

OTHER PUBLICATIONS

International Search Report and Written Report, dated Apr. 26, 2021, for International Application PCT/US 21/16892, 13 pages.
(Continued)

*Primary Examiner* — Nathanael R Briggs
(74) *Attorney, Agent, or Firm* — Seed Intellectual Property Law Group LLP (57) ABSTRACT

Systems and methods for providing a polarization recycling structure for use in applications, such as display systems that include a liquid crystal display assembly. The polarization recycling structure may include a first spatially varying polarizer spaced apart from a second spatially varying polarizer. The first spatially varying polarizer may include a lens array that receives light from a light source and focuses light of a first polarization state and passes light of a second polarization state. The second spatially varying polarizer receive light from the first spatially varying polarizer, passes the focused light of the first polarization state, and transforms the light of the second polarization state into the first polarization state, thereby providing only light of the first polarization state at the output of the polarization recycling structure. The polarization recycling structures improve the efficiency of lighting subsystems, thereby reducing power consumption, cost, space requirements, and providing other advantages.

20 Claims, 4 Drawing Sheets

(52) U.S. Cl.
CPC .. *G02F 1/133633* (2021.01); *G02F 1/133636* (2013.01); *G02F 1/133638* (2021.01)

(56) References Cited

U.S. PATENT DOCUMENTS

| | | | |
|---|---|---|---|
| 7,295,312 | B1 | 11/2007 | Gerhart et al. |
| 8,004,675 | B2 | 8/2011 | Lefaudeux |
| 8,235,533 | B2 | 8/2012 | Hudman et al. |
| 8,368,889 | B2 | 2/2013 | Schwiegerling et al. |
| 8,982,313 | B2 | 3/2015 | Escuti et al. |
| 9,298,041 | B2 | 3/2016 | Escuti et al. |
| 9,335,586 | B2 | 5/2016 | Escuti et al. |
| 9,410,677 | B2 | 8/2016 | Wheatley et al. |
| 10,203,489 | B2 | 2/2019 | Khan et al. |
| 2011/0032483 | A1* | 2/2011 | Hruska ............ G02B 30/25 353/8 |
| 2011/0310220 | A1 | 12/2011 | McEldowney |
| 2013/0027656 | A1 | 1/2013 | Escuti et al. |
| 2013/0286479 | A1 | 10/2013 | Sung et al. |
| 2015/0131311 | A1 | 5/2015 | Wheatley et al. |
| 2016/0182889 | A1 | 6/2016 | Olmstead |
| 2016/0349516 | A1 | 12/2016 | Alexander et al. |
| 2019/0107719 | A1 | 4/2019 | Edwin et al. |
| 2019/0179149 | A1 | 6/2019 | Curtis et al. |
| 2019/0243147 | A1* | 8/2019 | Smithwick ......... G02B 27/0103 |
| 2019/0377183 | A1 | 12/2019 | Sharp |
| 2020/0301147 | A1 | 9/2020 | Klug |

OTHER PUBLICATIONS

Hornburg et al., "Multiband retardation control using multi-twist retarders," Proc. of SPIE, Polarization: Measurement, Analysis, and Remote Sensing XI, vol. 9099, 90990Z, 2014, 9 pages.

Hornburg et al., "Wide color gamut multi-twist retarders," Proc. of SPIE, Emerging Liquid Crystal Technologies X, vol. 9384, 93840W, 2015, 11 pages.

ImagineOptix, "Consumer Electronics Optics," Augmented and Virtual Reality Optics Technology in Consumer Electronics—ImagineOptix, retrieved from <https://www.imaginoptix.com/applications/consumer-electronics/>, on Dec. 17, 2019, 3 pages.

Komanduri et al., "Multi-twist retarders for broadband polarization transformation," Proc. of SPIE, Emerging Liquid Crystal Technologies VII, vol. 8279, 82790E, 2012, 10 pages.

Komanduri et al., "Multi-twist retarders: broadband retardation control using self-aligning reactive liquid crystal layers," Optics Express, Optical Society of America, vol. 21, No. 1 Jan. 14, 2013, 17 pages.

Perreault, "Triple Wollaston-prism complete-Stokes imaging polarimeter," Optics Letters, Optical Society of America, vol. 38, No. 19, Oct. 1, 2013, 4 pages.

* cited by examiner

MICRO-LENS ARRAY POLARIZATION RECYCLING OPTIC FOR ILLUMINATION OPTICS

BACKGROUND

Technical Field

The present disclosure generally relates to display systems, and more particularly to polarizers for display systems.

Description of the Related Art

Demand for displays with heightened performance is increasing, including with the growth of smart phones, tablets, wearable devices, high-definition televisions, as well as other electronic devices. The growing popularity of virtual reality and augmented reality systems, particularly those using head mounted displays, has further increased such demand. Virtual reality systems typically envelop a wearer's eyes completely and substitute a "virtual" reality for the actual view (or actual reality) in front of the wearer, while augmented reality systems typically provide a semi-transparent or transparent overlay of one or more screens in front of a wearer's eyes such that actual view is augmented with additional information. In many virtual reality and augmented reality systems, the movement of a wearer of such a head mounted display may be tracked in various manners, such as via sensors in the head mounted display and/or external to it, in order to enable the images being shown to reflect user movements.

Increasingly, there is a demand for displays that have improved performance while also being smaller or larger in size, consuming less power, and generating less heat relative to what is currently available. Accordingly, needs exist for improved display panels, and for improved techniques for manufacturing and using display panels.

BRIEF SUMMARY

A polarization recycling structure may be summarized as including a first spatially varying polarizer that is configured to receive incident light from a light source, the first spatially varying polarizer forming a lens array including a plurality of lens elements that each focus light of a first polarization state, the first spatially varying polarizer further configured to pass incident light having a second polarization state orthogonal to the first polarization state without such light being focused by the lens elements of the lens array; and a second spatially varying polarizer spaced apart from the first spatially varying polarizer and positioned to receive light from the first spatially varying polarizer, the second spatially varying polarizer including an array of linear polarizer regions configured to pass light having the first polarization state, each of the linear polarizer regions in the array being sized and dimensioned to receive focused light of the first polarization state from a respective one of the lens elements of the lens array of the first spatially varying polarizer, the second spatially varying polarizer further including a polarization transformation region that surrounds the linear polarizer regions and transforms light having the second polarization state into light having the first polarization state. Each of the first spatially varying polarizer and the second spatially varying polarizer may comprise a multi-twist retarder. The lens array of the first spatially varying polarizer may comprise a micro-lens array diffraction pattern in a multi-twist retarder. The polarization transform region may comprise a phase retarder. The polarization transform region may include a quarter wave retarder. The second spatially varying polarizer may be positioned at a focal plane of the lens elements of the lens array of the first spatially varying polarizer. Each of the linear polarizer regions may have a largest dimension that is less than 100 microns, and each of the linear polarizer regions may be spaced apart from each other linear polarizer region by at least 0.5 millimeters. The linear polarizer regions may cumulatively include a surface area that is less than 5 percent of the surface area of the polarization transformation region.

A display may be summarized as including a light source; a polarization recycling structure including a first spatially varying polarizer that is configured to receive incident light from the light source, the first spatially varying polarizer forming a lens array including a plurality of lens elements that each focus light of a first polarization state, the first spatially varying polarizer further configured to pass incident light having a second polarization state orthogonal to the first polarization state without such light being focused by the lens elements of the lens array; and a second spatially varying polarizer spaced apart from the first spatially varying polarizer and positioned to receive light from the first spatially varying polarizer, the second spatially varying polarizer including an array of linear polarizer regions configured to pass light having the first polarization state, each of the linear polarizer regions in the array being sized and dimensioned to receive focused light of the first polarization state from a respective one of the lens elements of the lens array of the first spatially varying polarizer, the second spatially varying polarizer further including a polarization transformation region that surrounds the linear polarizer regions and transforms light having the second polarization state into light having the first polarization state; and a non-emissive display assembly positioned to receive light of the first polarization state from the second spatially varying polarizer. The non-emissive display assembly may include a liquid crystal display assembly. The light source may include an array of light emitting diodes. The display may be a display of a head-mounted display device, a television, a laptop computer, a smartphone, a tablet computer, a computer monitor, or a wearable electronic device. Each of the first spatially varying polarizer and the second spatially varying polarizer may include a multi-twist retarder. The lens array of the first spatially varying polarizer may include a micro-lens array diffraction pattern in a multi-twist retarder. The polarization transform region may include a phase retarder. The polarization transform region may include a quarter wave retarder. The second spatially varying polarizer may be positioned at a focal plane of the lens elements of the lens array of the first spatially varying polarizer. Each of the linear polarizer regions may have a largest dimension that is less than 100 microns. Each of the linear polarizer regions may be spaced apart from each other linear polarizer region by at least 0.5 millimeters.

A polarization recycling structure may be summarized as including a first multi-twist retarder that forms a lens array including a plurality of lens elements, each of the lens elements focuses light of a first polarization state and passes light of a second polarization state orthogonal to the first polarization state without focusing such light; and a second multi-twist retarder positioned at a focal plane of the lens elements of the lens array of the first multi-twist retarder, the second multi-twist retarder including an array of linear polarizer regions configured to pass light having the first polarization state, each of the linear polarizer regions in the array being sized and dimensioned to receive focused light of the first polarization state from a respective one of the lens elements of the lens array of the first multi-twist retarder, the second multi-twist retarder further including a polarization transformation region that surrounds the linear polarizer regions and transforms light having the second polarization state into light having the first polarization state.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Many direct view flat panel displays and projection type displays use unpolarized light sources, such as ambient light, CCFL lamps, light emitting diodes, or other types of light sources. However, may display systems, such as display systems that utilize liquid crystal (LC) materials including LC displays (LCDs) or LC on silicon (LCoS) micro-displays, may require light to be polarized to operate properly. Conventional polarizers that only permit light having a desired polarization to pass are available, but they are inefficient because unwanted light is typically absorbed or reflected toward a different direction. These types of polarizers may have an efficiency of less than 50%, which is undesirable especially in applications where power consumption, size, heat generation, or cost are significant factors. Other approaches recycle the unwanted polarization light by repeatedly reflecting it and then receiving the light again with at least some of it being the correct polarization. This technique provides relatively greater efficiency (e.g., 50-75%) compared to a reflective or absorptive polarizer, but a significant portion of the light from the randomly polarized light source is still lost.

Figure 1:
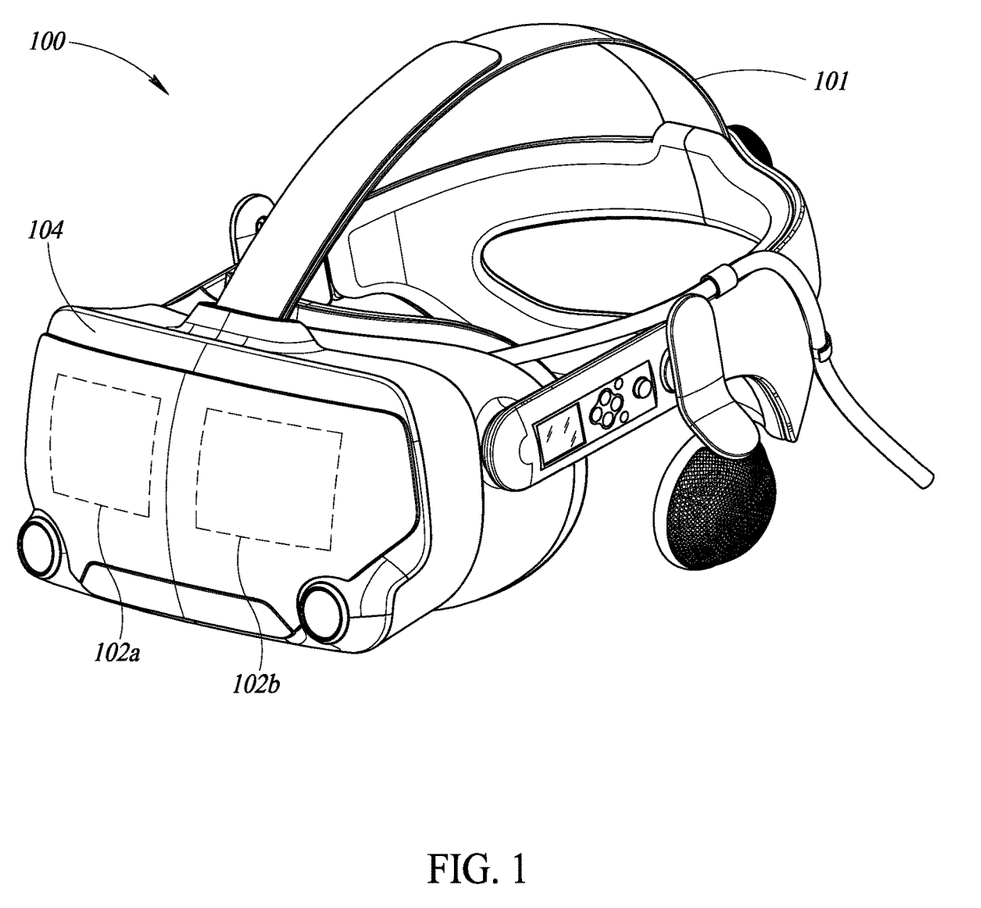
FIG. 1 is an example of a head-mounted display device that includes dual display panels, according to one illustrated implementation.
Figure 2:
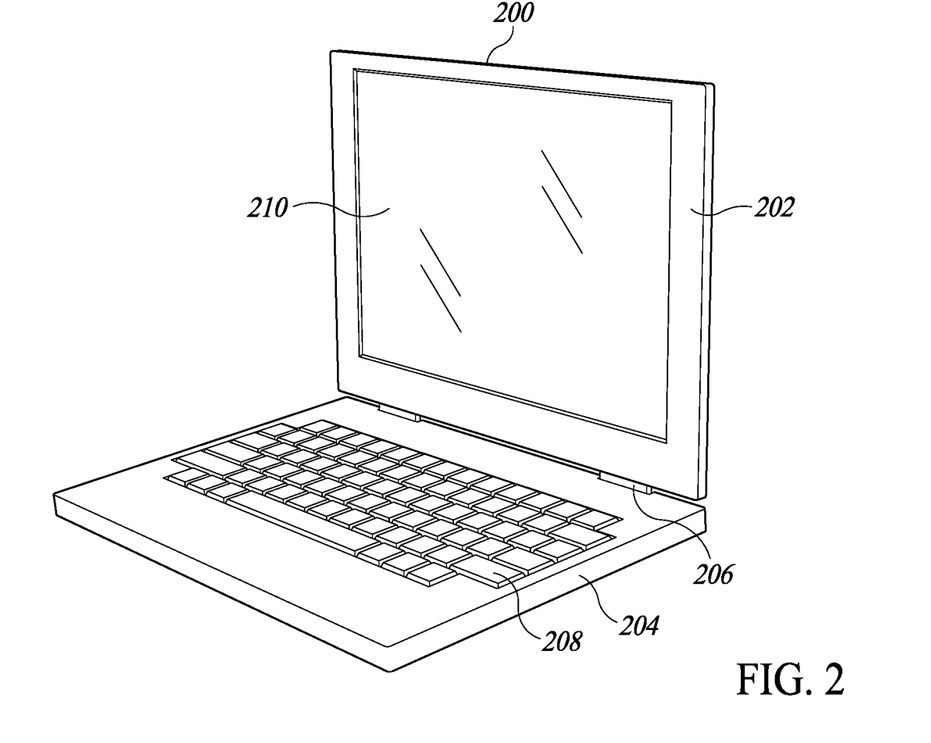
FIG. 2 is an example of a laptop that includes a display panel, according to one illustrated implementation.
Figure 3:
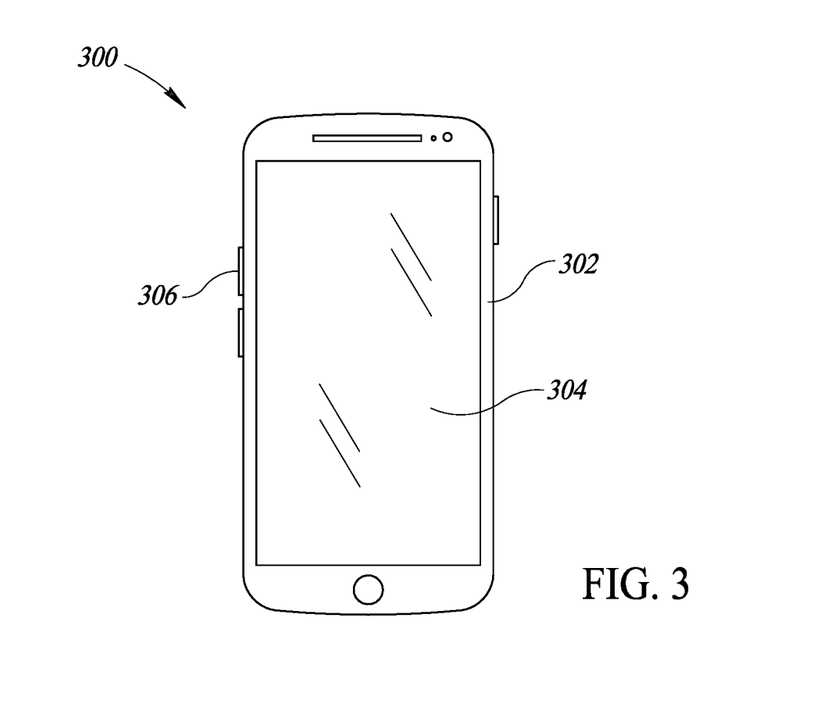
FIG. 3 is an example of a smartphone that includes a display panel, according to one non-limiting illustrated implementation.

One or more implementations of the present disclosure are directed to polarization recycling structures for use in a variety of applications including displays for electronic devices, such as head-mounted display devices, laptop computers, tablet computers, televisions, smartphones, wearable computers, computer monitors, etc. Non-limiting examples of electronic devices that may include such displays are shown in FIGS. 1-3. As discussed further below, the present disclosure improves the performance of display systems (e.g., LCD, LCoS) or other types of components by providing a polarization recycling structure that receives unpolarized or 45 degree polarized light and efficiently provides polarized light for use in various applications, such as display systems.

FIG. 1 illustrates a non-limiting example of an electronic device in the form of an head-mounted display device 100, which may be coupled to a video rendering computing system via a wired or wireless connection to provide a virtual reality display to a human user. In operation, the user wears the HMD device 100 on their head, secured via one or more straps 101, and receives displayed information at each eye via displays 102a and 102b supported by a support structure 104 of the HMD device from the computing system of a simulated environment different from the actual physical environment, with the computing system acting as an image rendering system that supplies images of the simulated environment to the HMD device for display to the user, such as images generated by a game program (not shown) and/or other software program (not shown) executing on the computing system. The user is further able to move around the actual physical environment in this example, and may further have one or more I/O ("input/output") devices to allow the user to further interact with the simulated environment, such as hand-held controllers that are communicatively coupled to the computing system via wired or wireless connections. As the user moves location and/or changes orientation of the HMD device 100, the position of the HMD device may be tracked, such as to allow a corresponding portion of the simulated environment to be displayed to the user on the HMD device, and the controllers may further employ similar techniques to use in tracking the positions of the controllers (and to optionally use that information to assist in determining and/or verifying the position of the HMD device). After the tracked position of the HMD device 100 is known, corresponding information is transmitted to the computing system, which uses the tracked position information to generate one or more next images of the simulated environment to display to the user via the displays 102a and 102b.

FIG. 2 shows an example electronic device in the form of a laptop computer 200 having an upper housing 202 and a lower housing 204 coupled together via hinges 206 that allow the housings to rotate relative to each other. The lower housing 204 includes a keyboard 208 and may include other structures (e.g., touchpad, various ports). The upper housing 202 includes a display panel 210 that may be used to display content to the user.

FIG. 3 shows an example electronic device in the form of a smartphone 300. The smartphone 300 includes a housing 302 that includes a display panel 304 and a plurality of input components 306 (e.g., buttons). In at least some implementations the display panel 304 may be a touchscreen display, for example.

More generally, the displays of the present disclosure may be implemented in any type of electronic device, such as the devices shown in FIGS. 1-3, or other devices including music players, augmented reality devices, gaming devices, navigation units, vehicle displays, wearable devices, kiosks, or other types of devices that include one or more displays.

Figure 4:
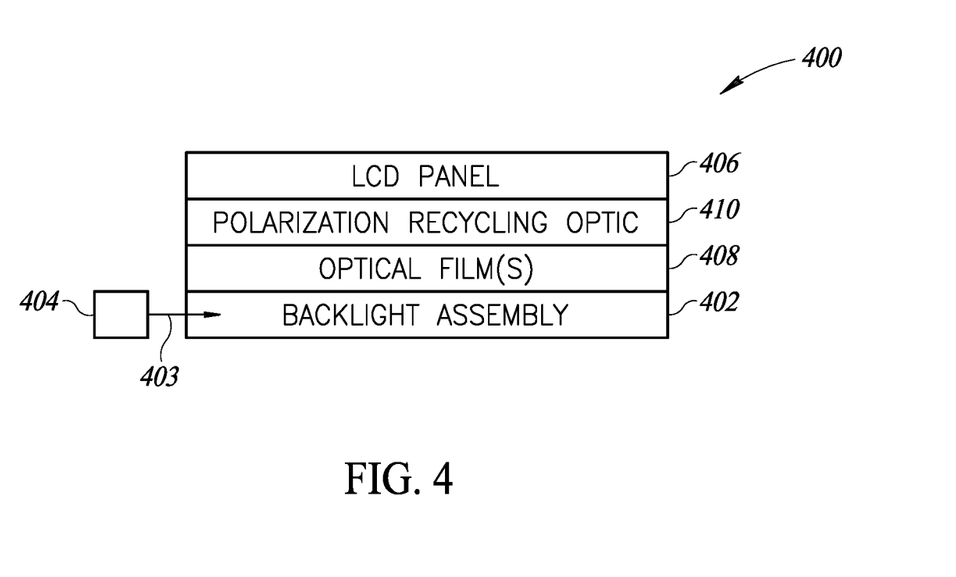
FIG. 4 is a sectional view of a display panel that includes a backlight assembly and a polarization recycling structure, according to one non-limiting illustrated implementation.

FIG. 4 shows a sectional side view of an example liquid crystal display (LCD) 400 according to one or more embodiments of the present disclosure. The display 400 may be implemented any type of electronic device, such as the devices 100, 200, and 300 of FIGS. 1, 2, and 3, respectively. Further, it should be appreciated that the implementations of the present disclosure may be used with other types of displays (e.g., LCoS) or in any other application where it is desired to efficiently obtain polarized light from unpolarized (randomly polarized) light.

The display 400 includes a number of stacked layers that may each be generally similar in shape (e.g., rectangular). The display 400 may include a backlight assembly 402 that receives light 403 from a light source 404 positioned substantially adjacent an edge of the backlight assembly 402. The display 400 also includes a display module that includes an LCD panel 406 or other display layers (e.g., any non-emissive display assembly layers), other light processing layers such as optical film(s) 408, and a polarization recycling optic or structure 410. As discussed further below, the polarization recycling structure 410 is operative to receive unpolarized light and to efficiently output linearly polarized light for use by the LCD panel 406. The optical film layer 408 may include one or more diffuser layers (e.g., diffuser films) that reduce hotspots, compensation films for enhancing off-axis viewing, or other types of films (e.g., prism films for collimating the backlight 402).

It should be appreciated that the configuration shown in FIG. 4 is merely illustrative and other configurations are contemplated which may include the same layers arranged differently, fewer or more layers, or different layers.

Figure 5:
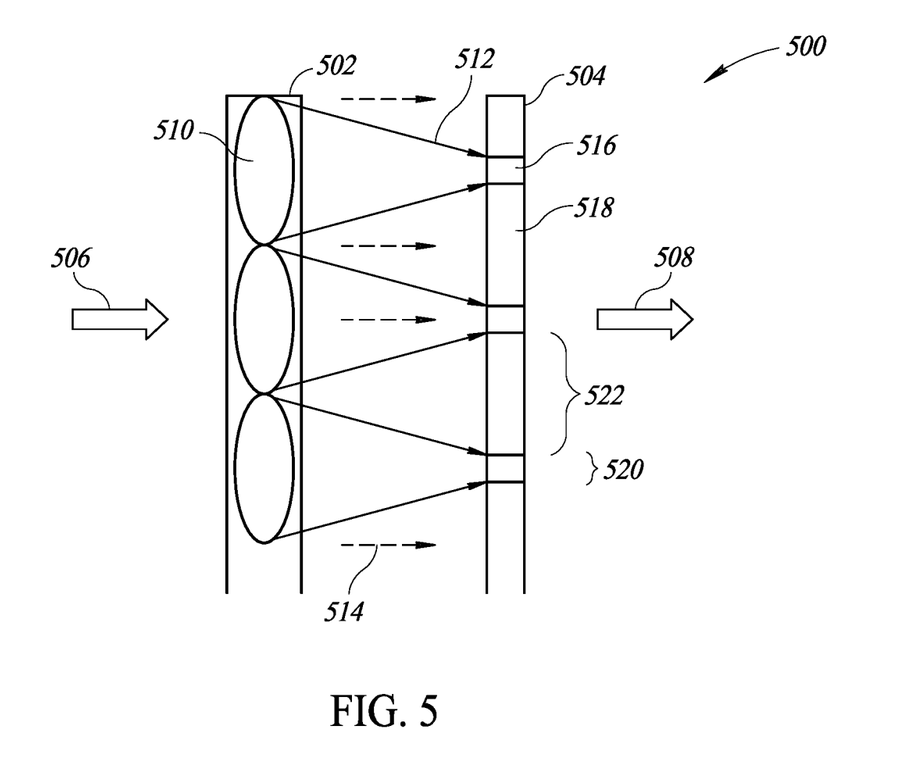
FIG. 5 is a simplified sectional view of the polarization recycling structure shown in FIG. 4, according to one non-limiting illustrated implementation.

FIG. 5 shows a simplified sectional side view of an example polarization recycling structure 500 that may implement the features of the present disclosure. The polarization recycling structure 500 may be implemented any type of electronic device, such as the devices 100, 200, and 300 of FIGS. 1, 2, and 3, respectively, and may be similar or identical to the polarization recycling structure 410 of FIG. 4.

Figure 6A:
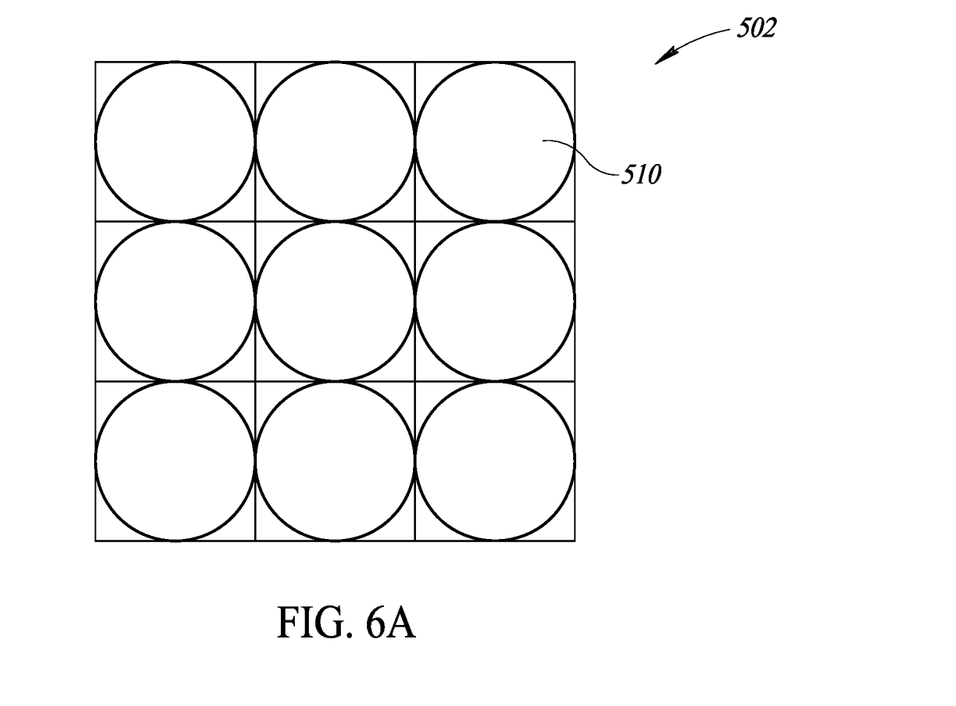
FIG. 6A is a front view of a first spatially varying polarizer of the polarization recycling structure that provides a micro-lens array, according to one non-limiting illustrated implementation.
Figure 6B:
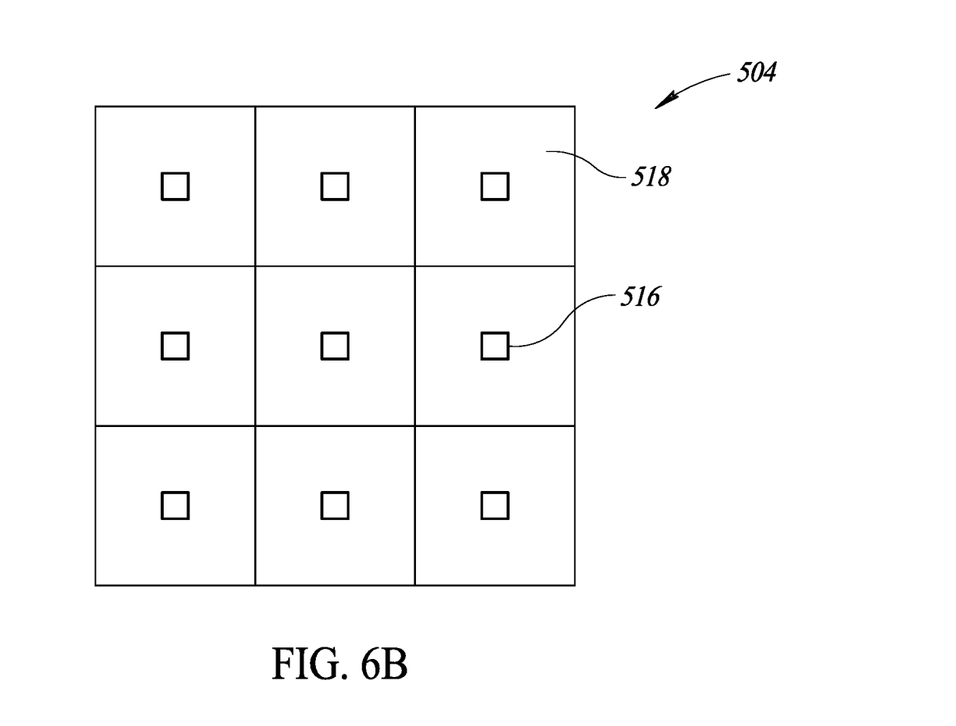
FIG. 6B is a front view of a second spatially varying polarizer of the polarization recycling structure that provides an array of linear polarizer regions surrounded by a polarization transformation region, according to one non-limiting illustrated implementation.

The polarization recycling structure 500 includes a first spatially varying polarizer 502 spaced apart from a second spatially varying polarizer 504. The polarizers 502 and 504 may be spaced apart using a suitable transparent spacer element or layer (not shown), for example. A simplified plan view of the first spatially varying polarizer 502 is shown in FIG. 6A, and a simplified plan view of the second spatially varying polarizer 504 is shown in FIG. 6B. As discussed further below, each of the first and second spatially varying polarizers 502 and 504 may be formed from multi-twist retarder (MTR) material. In operation, the polarization recycling structure 500 is operative to receive randomly polarized light 506 from a light source (e.g., LEDs), and to provide polarized light 508 of a first polarization state to a component, such as a liquid crystal component of a display, as discussed above.

The first spatially varying polarizer 502 is configured to receive the randomly polarized incident light 506. As shown in FIGS. 5 and 6A, the first spatially varying polarizer 502 may provide a diffractive pattern forming a lens array (e.g., 2D micro-lens array) that includes a plurality of lens elements 510 that each focus light 512 of the first polarization state. The first spatially varying polarizer 502 is further configured to pass incident light 514 (indicated in dashed lines in FIG. 5) having a second polarization state that is orthogonal to the first polarization state without such light being focused by the lens elements 510 of the lens array. In other words, the first spatially varying polarizer 502 may be polarization sensitive in that it focuses light of the first polarization state via the lens elements and passes light of the second polarization state without substantial modification.

The second spatially varying polarizer 504 may be spaced apart from the first spatially varying polarizer and may be positioned to receive light 512 and 514 from the first spatially varying polarizer 502. As an example, the second spatially varying polarizer 504 may be positioned at or proximate to the focal plane of the lens elements 510 of the first spatially varying polarizer. As shown in FIGS. 5 and 6B, the second spatially varying polarizer 504 includes an array of linear polarizer regions 516 configured to pass the focused light 512 having the first polarization state. As shown, each of the linear polarizer regions 516 in the array may be sized and dimensioned to receive the focused light 512 of the first polarization state from a respective one of the lens elements 510 of the lens array of the first spatially varying polarizer 502.

The second spatially varying polarizer 504 further includes a polarization transformation region 518 that surrounds the linear polarizer regions 516 and transforms light 514 having the second polarization state into light having the first polarization state. As an example, the polarization transformation region 518 may include a phase retarder, such as a quarter wave retarder. Thus, the light 508 exiting the polarization recycling structure 500 is light of the first polarization state that is required by one or more downstream components, such as a liquid crystal assembly of a display system (e.g., LCD, LCoS).

Each of the linear polarizer regions 516 may have a largest dimension 520 (FIG. 5) that is less than or equal to 100 microns (e.g., 20 microns, 50 microns, 80 microns), and each of the linear polarizer regions may be spaced apart from each other linear polarizer region by a distance 522, which in some implementations may be at least 0.5 millimeters (e.g., 0.5 millimeters, 1 millimeter, 2 millimeters). In at least some implementations, the linear polarizer regions 516 cumulatively comprise a surface area that is less than or equal to 5 percent (e.g., 0.5 percent, 1 percent, 3 percent) of the surface area of the polarization transformation region 518. The linear polarizer regions 516 may have any suitable surface area shape (e.g., circular, rectangular).

As an overview of the operation of the polarization recycling structure 500, the incident light 506 comprises light in both of the first and second orthogonal polarization states. The portion of the light 506 having the first polarization state is focused by the lens elements 510 of the first spatially varying polarizer 502 and passes through the linear polarizer regions 516 of the second spatially varying polarizer 504 to exit the polarization recycling structure 500 as the light 508 of the first polarization state. The portion of the light 506 having the second polarization state passes through the first spatially varying polarizer 502 without being focused by the lens elements 510 (see light 514), and is transformed by the polarization transformation region 518 of the second spatially varying polarizer 504 into the first polarization state to also exit the polarization recycling structure 500 as the light 508 of the first polarization state. Thus, all of the light 506 incident on the polarization recycling structure 500 is provided at the output as the light 508 of the first polarization state except for the light 514 of the second polarization state that is blocked by the linear polarizer regions 516 of the second spatially varying polarizer 504. However, since the area of the linear polarizer regions may be small relative to the overall area of the spatially varying polarizer 504 that mostly comprises the polarization transform region 518, only a small fraction (e.g., 1 percent, 5 percent) of the light 506 is lost. Thus, the polarization recycling structure 500 may advantageously provide polarized light from unpolarized light at a very high efficiency (e.g., over 90 percent, over 95 percent).

As discussed above, one or both of the first and second spatially varying polarizers 502 and 504 of the polarization recycling structure 500 may comprise a wave retarder that is formed of birefringent materials. Birefringence is the property of a material that has a refractive index that depends on the polarization and propagation direction of light. The wave retarder alters the polarization state or phase of light traveling through the wave retarder. The wave retarder may have a slow axis (or extraordinary axis) and a fast axis (ordinary axis). As polarized light travels through the wave retarder, the light along the fast axis travels more quickly than along the slow axis.

In at least some implementations, the spatially varying polarizers 502 and 504 may be formed of a multi-twist retarder (MTR), which is a waveplate-like retardation film that provides precise and customized levels of broadband, narrowband or multiple band retardation in a single thin film. More specifically, MTR comprises two or more twisted liquid crystal (LC) layers on a single substrate and with a single alignment layer. Subsequent LC layers are aligned directly by prior layers, allowing simple fabrication, achieving automatic layer registration, and resulting in a monolithic film with a continuously varying optic axis.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A polarization recycling structure, comprising:
a first spatially varying polarizer that is configured to receive incident light from a light source, the first spatially varying polarizer forming a lens array comprising a plurality of lens elements that each focus light of a first polarization state, the first spatially varying polarizer further configured to pass incident light having a second polarization state orthogonal to the first polarization state without such light being focused by the lens elements of the lens array; and
a second spatially varying polarizer spaced apart from the first spatially varying polarizer and positioned to receive light from the first spatially varying polarizer, the second spatially varying polarizer comprising an array of linear polarizer regions configured to pass light having the first polarization state, each of the linear polarizer regions in the array being sized and dimensioned to receive focused light of the first polarization state from a respective one of the lens elements of the lens array of the first spatially varying polarizer, the second spatially varying polarizer further comprising a polarization transformation region that surrounds the linear polarizer regions and transforms light having the second polarization state into light having the first polarization state.

2. The polarization recycling structure of claim 1 wherein each of the first spatially varying polarizer and the second spatially varying polarizer comprises a multi-twist retarder.

3. The polarization recycling structure of claim 1 wherein the lens array of the first spatially varying polarizer comprises a micro-lens array diffraction pattern in a multi-twist retarder.

4. The polarization recycling structure of claim 1 wherein the polarization transform region comprises a phase retarder.

5. The polarization recycling structure of claim 1 wherein the polarization transform region comprises a quarter wave retarder.

6. The polarization recycling structure of claim 1 wherein the second spatially varying polarizer is positioned at a focal plane of the lens elements of the lens array of the first spatially varying polarizer.

7. The polarization recycling structure of claim 1 wherein each of the linear polarizer regions has a largest dimension that is less than 100 microns, and each of the linear polarizer regions are spaced apart from each other linear polarizer region by at least 0.5 millimeters.

8. The polarization recycling structure of claim 1 wherein the linear polarizer regions cumulatively comprise a surface area that is less than 5 percent of the surface area of the polarization transformation region.

9. A display, comprising:
- a light source;
- a polarization recycling structure comprising:
  - a first spatially varying polarizer that is configured to receive incident light from the light source, the first spatially varying polarizer forming a lens array comprising a plurality of lens elements that each focus light of a first polarization state, the first spatially varying polarizer further configured to pass incident light having a second polarization state orthogonal to the first polarization state without such light being focused by the lens elements of the lens array; and
  - a second spatially varying polarizer spaced apart from the first spatially varying polarizer and positioned to receive light from the first spatially varying polarizer, the second spatially varying polarizer comprising an array of linear polarizer regions configured to pass light having the first polarization state, each of the linear polarizer regions in the array being sized and dimensioned to receive focused light of the first polarization state from a respective one of the lens elements of the lens array of the first spatially varying polarizer, the second spatially varying polarizer further comprising a polarization transformation region that surrounds the linear polarizer regions and transforms light having the second polarization state into light having the first polarization state; and
- a non-emissive display assembly positioned to receive light of the first polarization state from the second spatially varying polarizer.

10. The display of claim 9 wherein the non-emissive display assembly comprises a liquid crystal display assembly.

11. The display of claim 9 wherein the light source comprises an array of light emitting diodes.

12. The display of claim 9 wherein the display is a display of a head-mounted display device, a television, a laptop computer, a smartphone, a tablet computer, a computer monitor, or a wearable electronic device.

13. The display of claim 9 wherein each of the first spatially varying polarizer and the second spatially varying polarizer comprises a multi-twist retarder.

14. The display of claim 9 wherein the lens array of the first spatially varying polarizer comprises a micro-lens array diffraction pattern in a multi-twist retarder.

15. The display of claim 9 wherein the polarization transform region comprises a phase retarder.

16. The display of claim 9 wherein the polarization transform region comprises a quarter wave retarder.

17. The display of claim 9 wherein the second spatially varying polarizer is positioned at a focal plane of the lens elements of the lens array of the first spatially varying polarizer.

18. The display of claim 9 wherein each of the linear polarizer regions has a largest dimension that is less than 100 microns.

19. The display of claim 9 wherein each of the linear polarizer regions are spaced apart from each other linear polarizer region by at least 0.5 millimeters.

20. A polarization recycling structure, comprising:
- a first multi-twist retarder that forms a lens array comprising a plurality of lens elements, each of the lens elements focuses light of a first polarization state and passes light of a second polarization state orthogonal to the first polarization state without focusing such light; and
- a second multi-twist retarder positioned at a focal plane of the lens elements of the lens array of the first multi-twist retarder, the second multi-twist retarder comprising an array of linear polarizer regions configured to pass light having the first polarization state, each of the linear polarizer regions in the array being sized and dimensioned to receive focused light of the first polarization state from a respective one of the lens elements of the lens array of the first multi-twist retarder, the second multi-twist retarder further comprising a polarization transformation region that surrounds the linear polarizer regions and transforms light having the second polarization state into light having the first polarization state.

* * * * *